United States Patent
Carlsson

(10) Patent No.: US 10,931,316 B2
(45) Date of Patent: Feb. 23, 2021

(54) RADIO FREQUENCY TRANSCEIVER

(71) Applicant: Sivers Ima AB, Kista (SE)

(72) Inventor: Mats Carlsson, Sundbyberg (SE)

(73) Assignee: Sivers Ima AB

( * ) Notice: Subject to any disclaimer, the term of this patent is extended or adjusted under 35 U.S.C. 154(b) by 0 days.

(21) Appl. No.: 16/381,945

(22) Filed: Apr. 11, 2019

(65) Prior Publication Data

US 2019/0326939 A1   Oct. 24, 2019

(30) Foreign Application Priority Data

Apr. 18, 2018 (EP) .................................... 18168031

(51) Int. Cl.
  *H04B 1/00* (2006.01)
  *H04B 1/28* (2006.01)
  *H04B 7/0426* (2017.01)

(52) U.S. Cl.
  CPC ......... *H04B 1/0039* (2013.01); *H04B 1/0096* (2013.01); *H04B 1/28* (2013.01); *H04B 7/043* (2013.01)

(58) Field of Classification Search
  None
  See application file for complete search history.

(56) References Cited

U.S. PATENT DOCUMENTS

| | | | | |
|---|---|---|---|---|
| 7,035,341 | B2* | 4/2006 | Mohindra | H04L 27/3809 375/261 |
| 7,158,586 | B2* | 1/2007 | Husted | H04L 27/3863 375/324 |
| 7,450,907 | B2* | 11/2008 | Shurvinton | H03G 3/3047 370/328 |
| 8,219,047 | B2* | 7/2012 | Camuffo | H04B 17/14 455/127.1 |
| 8,265,584 | B2* | 9/2012 | Khoury | H04B 1/28 455/296 |
| 8,606,210 | B2* | 12/2013 | Ru | H03D 7/14 455/323 |
| 8,630,598 | B2* | 1/2014 | Laroia | H03D 3/008 330/149 |
| 9,148,234 | B2* | 9/2015 | Sundstrom | H04B 3/46 |
| 9,154,338 | B1* | 10/2015 | Tsatsanis | H04L 43/12 |
| 9,194,911 | B2* | 11/2015 | Palaskas | G01R 31/31813 |

(Continued)

FOREIGN PATENT DOCUMENTS

| EP | 3142258 A1 * | 3/2017 | ............ H04B 1/525 |
|---|---|---|---|
| EP | 3142258 B1 * | 8/2018 | ............ H04B 1/006 |
| EP | 3557769 A1 * | 10/2019 | ............ H04B 1/28 |

*Primary Examiner* — Berhanu Tadese
(74) *Attorney, Agent, or Firm* — Condo Roccia Koptiw LLP

(57) ABSTRACT

A radio frequency transceiver is disclosed herein. The radio frequency transceiver comprises a transmitter, a receiver comprising a full complex mixer capable of operating as a frequency down-converter, and an in-phase and quadrature (IQ) imbalance calibration module. The IQ imbalance calibration module is connected with (e.g., only connected with) the transmitter. The IQ imbalance calibration module is arranged calibrate the transmitter to reduce its IQ imbalance. The IQ imbalance calibration module is not arranged calibrate the receiver. Use of the full complex mixer in the receiver eliminates the need for calibrating the receiver.

17 Claims, 3 Drawing Sheets

(56) References Cited

U.S. PATENT DOCUMENTS

| | | | | |
|---|---|---|---|---|
| 9,231,839 | B1* | 1/2016 | Chen | H04L 27/2089 |
| 9,264,156 | B2* | 2/2016 | Wilhelmsson | H04L 27/3863 |
| 9,438,464 | B2* | 9/2016 | Tsatsanis | H04L 43/12 |
| 9,941,923 | B2* | 4/2018 | Esmaeilzadeh Najari | H04B 1/48 |
| 2003/0147385 | A1* | 8/2003 | Montalvo | H04L 47/125 370/389 |
| 2004/0063416 | A1* | 4/2004 | Kuenen | H04L 27/3863 455/313 |
| 2005/0047384 | A1* | 3/2005 | Wax | H04W 72/046 370/338 |
| 2005/0186930 | A1 | 8/2005 | Rofougaran et al. | |
| 2006/0256216 | A1* | 11/2006 | Takahiko | H03D 3/007 348/264 |
| 2006/0281429 | A1* | 12/2006 | Kishi | H04B 1/30 455/313 |
| 2007/0025474 | A1* | 2/2007 | Moorti | H04B 1/12 375/329 |
| 2007/0118583 | A1* | 5/2007 | Nagasaka | H03H 17/06 708/319 |
| 2007/0171312 | A1* | 7/2007 | Kishi | H03D 3/007 348/726 |
| 2008/0025381 | A1* | 1/2008 | Lee | H04L 27/3863 375/219 |
| 2009/0233562 | A1 | 9/2009 | Kim et al. | |
| 2011/0069744 | A1* | 3/2011 | Laudel | H04L 27/0014 375/219 |
| 2011/0150112 | A1* | 6/2011 | Guo | H04L 27/0014 375/260 |
| 2011/0207418 | A1* | 8/2011 | Laroia | H03D 3/009 455/75 |
| 2012/0300818 | A1* | 11/2012 | Metreaud | H04B 1/30 375/219 |
| 2012/0328041 | A1* | 12/2012 | Chen | H04L 27/364 375/285 |
| 2013/0173203 | A1* | 7/2013 | Palaskas | G01R 31/31813 702/117 |
| 2014/0148112 | A1* | 5/2014 | Sundstrom | H04B 3/46 455/226.1 |
| 2014/0204986 | A1* | 7/2014 | Suissa | H04L 27/38 375/219 |
| 2014/0321516 | A1* | 10/2014 | Al-Qaq | H04B 17/29 375/221 |
| 2014/0341263 | A1* | 11/2014 | Wu | H04B 17/14 375/224 |
| 2015/0071381 | A1* | 3/2015 | Nadiri | H04L 27/367 375/296 |
| 2015/0071390 | A1* | 3/2015 | Muhammad | H04B 1/10 375/346 |
| 2015/0071391 | A1* | 3/2015 | Wilhelmsson | H04L 27/3863 375/346 |
| 2015/0304133 | A1* | 10/2015 | Tsatsanis | H04L 27/3863 375/227 |
| 2016/0020925 | A1* | 1/2016 | Tsatsanis | H04L 27/3863 375/227 |
| 2016/0149652 | A1* | 5/2016 | Huang | H04B 7/0617 375/221 |
| 2016/0359614 | A1* | 12/2016 | Hao | H04L 7/033 |
| 2017/0005855 | A1* | 1/2017 | Tsatsanis | H04L 27/3863 |
| 2017/0077984 | A1* | 3/2017 | Esmaeilzadeh Najari | H04B 1/48 |
| 2017/0285172 | A1* | 10/2017 | Babitch | G01S 19/235 |
| 2017/0288790 | A1* | 10/2017 | Haub | H04B 17/14 |
| 2019/0137646 | A1* | 5/2019 | Frey | G01V 3/30 |
| 2019/0190451 | A1* | 6/2019 | D'Alessandro | H04L 27/3863 |

* cited by examiner

RADIO FREQUENCY TRANSCEIVER

CROSS REFERENCE TO RELATED APPLICATIONS

This application claims the benefit of European patent application no. 18168031.5, filed 18 Apr. 2018, the contents of which are incorporated herein by reference in their entireties.

FIELD OF THE INVENTION

The present invention relates to the field of radio frequency (RF) transceivers, and more particularly to compensation of in-phase and quadrature (IQ) imbalances in RF transceivers.

BACKGROUND OF THE INVENTION

It is well known in the art that the amplitude and phase mismatch between I and Q signals must be kept small to maintain the intended signal quality in up-converters and down-converters in direct-conversion transceivers as well as in transceivers using one or more Intermediate Frequency steps. To achieve 90 degrees phase difference and equal amplitude between I and Q signals, calibration is required. Many different calibration procedures have been used in products on the market. These different calibration procedures are well described in literature and in publications. For instance, the book RF Imperfections in High-rate Wireless Systems (ISBN 978-1-4020-6902-4) describes IQ imbalance calibration in detail on pages 139-183.

Since the IQ imperfections are found in both receive (down-converters) and in transmit (up-converters) circuits, calibration of both the receiver and the transmitter is performed.

To calibrate the transmitter, known and well controlled input stimuli is required to be provided by a modem in the system, or by other means in the RF IC. The input stimuli are fed to the input of the transmitter and the resulting error is measured at the transmitter's output. In a similar manner, to calibrate the receiver, input stimuli are required to be provided to the input of the receiver and the resulting error is measured at the receiver's output. A typical procedure for calibration of IQ imbalance in a direct-conversion transceiver system consists of a calibration of IQ imbalance in the receiver followed by a calibration of the IQ imbalance in the transmitter as follows.

A series of RF tones are generated and fed to the input of the RF section of the receiver. Then the RF tones are down-converted to base band and the corresponding IQ imbalance is detected in the digital domain, such as by means of FTT (Fast Fourirer Transform) analysis or by means of a cross correlator. When the IQ imbalance is known, correction parameters are fed to the receiver to reduce the IQ imbalance to an acceptable level. When the receiver has been calibrated as described above, it can be used to calibrate the transmitter as follows. A series of complex tones is generated in the modem and fed as IQ baseband signals to the up-converter of the transmitter. Instead of transmitting the up-converted signal to the antenna, it is fed to the input of the receiver through a loopback connection on chip. The signal from the transmitter is then down-converted to base band and the corresponding IQ imbalance is detected in the digital domain, such as by means of FTT analysis or by means of a cross correlator. Since the receiver can be considered as being ideal after it has been calibrated, the detected IQ imbalance is related to imperfections of the transmitter. Finally, correction parameters are fed to the transmitter to reduce the IQ imbalance to an acceptable level.

The calibration routines described above are rather time consuming to execute. Consequently, it would be advantageous to simplify the procedure.

SUMMARY OF THE INVENTION

It would be advantageous to simplify the IQ imbalance calibration of the prior art.

To better address this issue, in a first aspect of the invention there is presented a radio frequency transceiver comprising a transmitter, a receiver, which comprises a full complex mixer constituting a frequency down-converter, and an in-phase and quadrature imbalance calibration module, which is arranged to merely calibrate the transmitter. According to the present invention, it has been realized, and it has been shown, that by including a full complex mixer in the receiver it is possible to perform merely an IQ imbalance calibration of the transmitter, and omit the IQ imbalance calibration of the receiver. Additionally, it has been shown that the facilitation of the IQ imbalance calibration process surpasses the added circuit complexity.

In accordance with an embodiment of the radio frequency transceiver it comprises a loopback connection from the transmitter to the receiver.

In accordance with an embodiment of the radio frequency transceiver it comprises an envelope detector connected with the transmitter and with the in-phase and quadrature imbalance calibration module.

In accordance with an embodiment of the radio frequency transceiver the receiver comprises a first receiver module for initial RF signal processing, and a second receiver module for continued signal processing of the frequency down-converted signal, wherein the full complex mixer is connected to the first receiver module and to the second receiver module.

In accordance with an embodiment of the radio frequency transceiver the full complex mixer comprises a radio signal input, a cosine signal input, a sine signal input, first to fourth mixers, a subtractor, an adder, an in-phase signal output, and a quadrature signal output, wherein the first and fourth mixers are connected with the radio frequency input and the cosine signal input, wherein the second and third mixers are connected with the radio frequency signal input and the sine signal input, wherein the subtractor is connected with the first and third mixers and the in-phase signal output, and wherein the adder is connected with the second and fourth mixers and with the quadrature signal output.

In accordance with an embodiment of the radio frequency transceiver it is a direct-conversion transceiver.

In accordance with another aspect of the present invention there is provided a beamforming transceiver radio frequency integrated circuit comprising a radio frequency transceiver as described above.

BRIEF DESCRIPTION OF THE DRAWINGS

The invention will now be described in more detail and with reference to the appended drawings in which.

DESCRIPTION OF EMBODIMENTS

Figure 1:
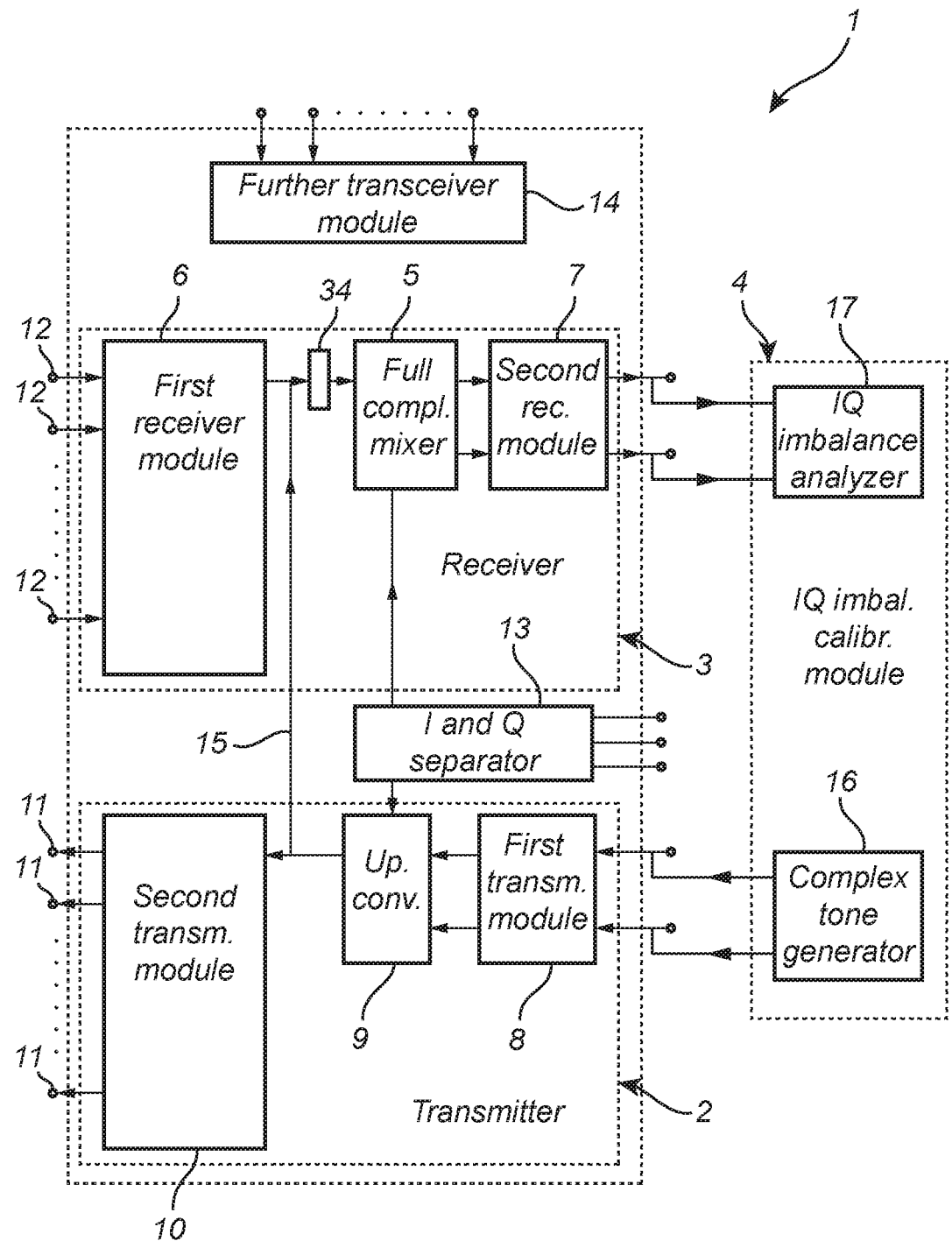
FIGS. 1-3 are schematic block diagrams of embodiments of an RF transceiver according to the present invention.

As shown in FIG. 1 a first embodiment of the RF transceiver 1 comprises a transmitter 2, a receiver 3, and an in-phase and quadrature (IQ) imbalance calibration module 4, which is connected with the transmitter 2 and the receiver 3, while being arranged to merely calibrate the transmitter 2. The receiver 3 comprises a full complex mixer 5 as frequency down-converter. The use of a full complex mixer 5 in an RF transceiver is known per se, e.g. from US 2006/0281429 A1, but it has not been used in combination with an IQ imbalance calibration module, and in particular not in order to remove the IQ imbalance calibration of the receiver and merely perform the IQ imbalance calibration on the transmitter.

The receiver 3 further comprises a first receiver module 6 for initial RF signal processing, an I and Q filter 34, wherein the first receiver module 6 is connected to an input of the full complex mixer 5 via the I and Q filter 34, and a second receiver module 7 for continued signal processing of the down-converted signal, wherein the second receiver module is connected to an output of the full complex mixer 5. Similarly, the transmitter 2 comprises a first transmitter module 8 for initial transmit processing, such as signal amplification, an up-converter 9, connected to an output the first transmitter module 8, and a second transmitter module 10, for final signal processing, connected to an output of the up-converter 9. Output terminals 11 of the second transmitter module 10 are connected with transmit antenna elements, while input terminals 12 of the first receiver module 6 are connected with receive antenna elements.

The RF transceiver further comprises an I and Q separator 13, which is connected with the transmitter 2 and with the receiver 3. More particularly, the I and Q separator generates 90 degrees phase shifted signals, such as a cosine signal and a sine signal, and provides these signals to the full complex mixer 5 as well as to the up-converter 9.

The RF transceiver 1 further comprises various additional circuitry such as power supply circuitry, automatic gain control circuitry, etc., as well known to the person skilled in the art, here illustrated by a further transceiver module 14.

The RF transceiver 1 can be a direct-conversion transceiver as well as a transceiver having one or more steps of intermediate frequency, such as a transceiver with a super-heterodyne receiver and transmitter. The modules above contain the respective necessary circuitry for those different options.

Moreover, in this embodiment, there is a loopback connection 15 connected at the output side of the up-converter 9 and at the input side of the full complex mixer 5. The loopback connection 15 is used for the IQ imbalance calibration. The IQ imbalance calibration module 4 comprises a complex tone generator 16, connected to the input of the first transmitter module 8, and an IQ imbalance analyzer 17, connected to the output of the second receiver module 7. It should be noted that the position of the loopback connection is merely one example of many possible positions. At the transmitter side the loopback connection can be connected at an optional position between the output of the up-converter 9 and the transmit antenna, and at the receiver side the loopback connection can be connected at an optional position between the receive antenna and the input of the full complex mixer 5.

The first embodiment of the RF transceiver is operated as follows with regard to the IQ imbalance calibration. The complex tone generator 16 generates a series of complex tones, which is a complex signal at baseband frequency. The series of complex tones is fed as baseband I and Q signals to the first transmitter module 8 for initial transmit processing, such as signal amplification, and further to the up-converter 9 for frequency up-conversion and combination to an RF transmit signal. From the output of the up-converter 9, the RF transmit signal is fed to the second transmitter module 10, and, via the loopback connection 15, to the receiver side where it is added to the RF receive signal. The combined RF signal is fed to the input of the full complex mixer 5, via the I and Q filter 34, which divides the RF signal into I and Q signals. After being frequency down-converted and having passed the second receiver module 7, the I and Q signals are fed to the IQ imbalance analyser 17. Since the complex mixer 5 is ideal, or at least negligibly non-ideal, any imbalance detected by the IQ imbalance analyser 17 is due to imperfections of the transmitter. The IQ imbalance calibration module 4 adjusts the transmitter accordingly, if necessary. The IQ imbalance analysis typically is made by means of a software implemented algorithm applied on FFT (Fast Fourier Transform) transformations of the input signals to the IQ imbalance analyser 17.

Figure 2:
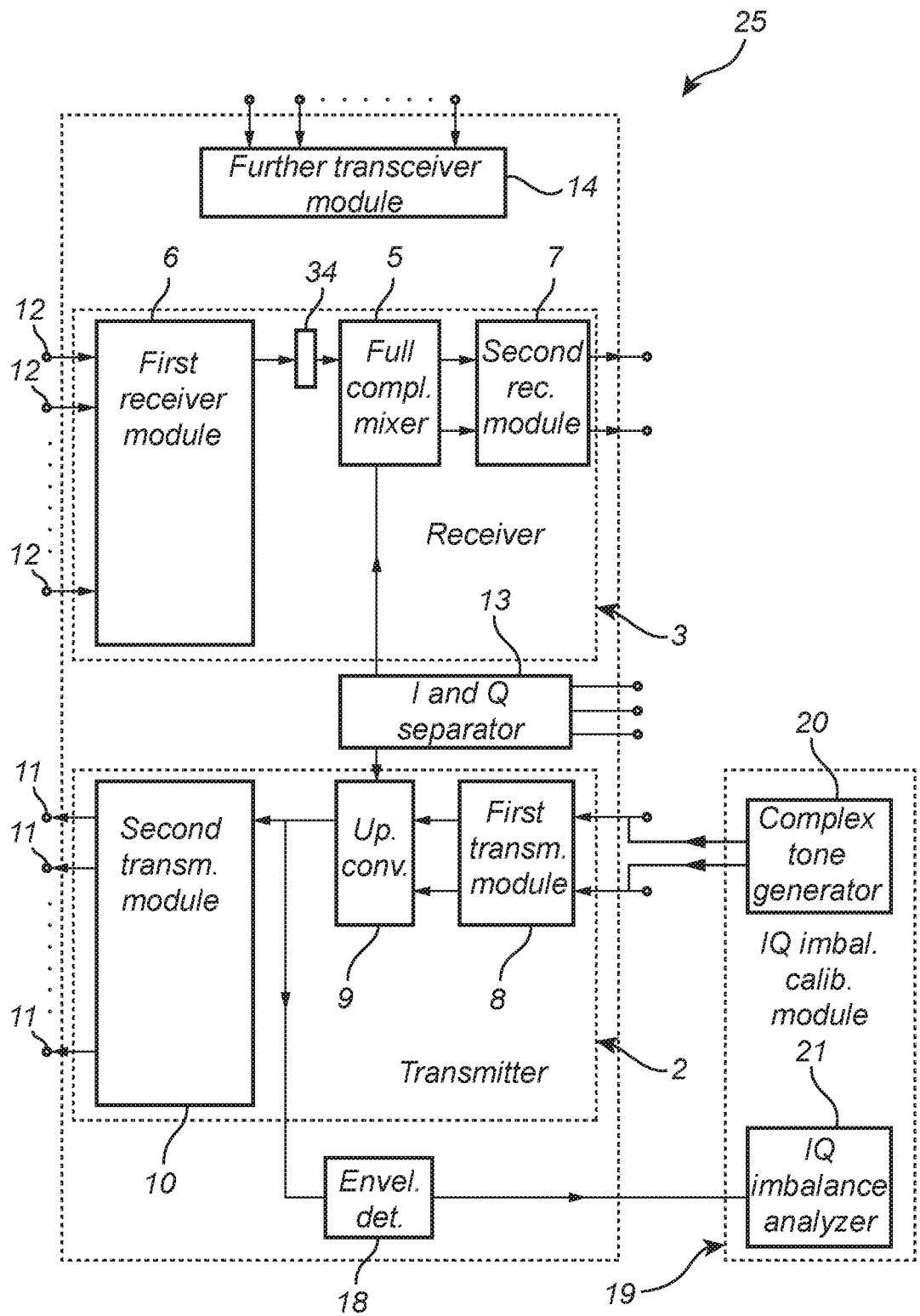

A second embodiment of the RF transceiver 25, as shown in FIG. 2, corresponds with the first embodiment except for the IQ imbalance calibration parts. In this embodiment, instead of the loopback structure, there is provided an envelope detector module 18 connected at the output side of the up-converter 9 and connected to the IQ imbalance calibration module 19. It should be noted that, alternatively, the envelope detector module 18 can connected at an optional position after the up-converter 9 and before the transmit antenna, as desired. In this embodiment, the IQ imbalance calibration module 19 comprises a complex tone generator 20, connected to the input of the first transmitter module 8, and an IQ imbalance analyzer 21, connected to the envelope detector module 18. An advantage of this embodiment is that the loopback connection is avoided. This is possible since the receiver is considered to be ideal, i.e. balanced, with regards to I and Q signals due to the full complex mixer 5. However, a drawback of this embodiment is that the envelope detectors used in the envelope detector module 18 are often difficult to implement with good enough performance.

The second embodiment operates as follows. A series of complex tones is generated by means of the complex tone generator 20 and fed as I and Q signals to the first transmitter module 8, and then further to the up-converter 9. The RF signal output from the up-converter is fed to the envelope detector 18. The output signal of the envelope detector 18 is fed to the IQ imbalance analyser 21, which determines the IQ imbalance, if any. Then the IQ imbalance calibration module 19 adjusts the transmitter accordingly.

Figure 3:
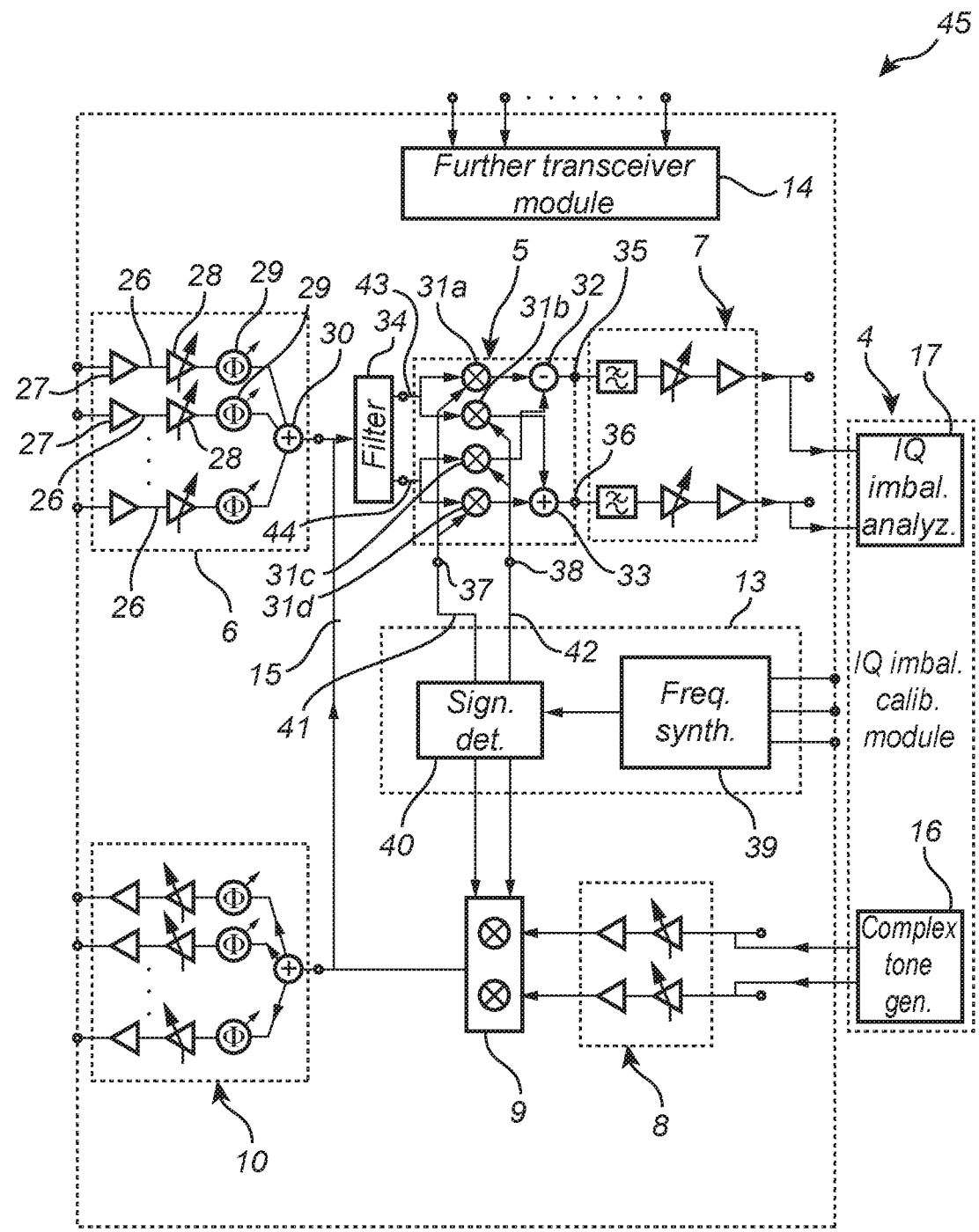

FIG. 3 shows an example of applying the first embodiment to a direct-conversion transceiver 45. In this example, the first receiver module 6 comprises several receive signal paths 26, one for each receive antenna element (not shown), each having amplifier circuitry 27, 28 and a phase shifter 29. The first receiver module 6 further comprises an adder 30, connected to all receive signal paths 26. The full complex mixer 5 comprises four mixer elements 31a-31d, a subtractor 32, an adder 33, RF I and Q signal inputs 43, 44, respective I and Q signal outputs 35, 36, a cosine signal input 37, and a sine signal input 38. The RF I signal input is connected with a first and a second mixer element 31a and 31b of the mixer elements 31a-d, while the RF Q signal is connected with third and fourth mixer elements 31c and 31d thereof. The cosine signal input 37 is connected with the first and the fourth mixer element 31a, 31d, and the sine signal input 38 is connected with the second and the third mixer element 31b, 31c. The outputs of the mixer elements 31a-31d are connected in pairs to the subtractor 32 and the adder 33, respectively, so that the outputs of the first and the third mixers 31a, 31c are connected with the subtractor 32, and the outputs of the second and fourth mixer elements 31b, 31d are connected with the adder 33. As understood by the person skilled in the art, other combinations and connections of adders and subtractors are feasible as well.

The I and Q separator 13 comprises a frequency synthesizer 39, and a sine and cosine signal generator 40, having a cosine and sine signal outputs 41, 42 connected with the cosine and sine signal inputs 37, 38 of the full complex mixer 5, and with corresponding inputs of the up-converter 9.

The present invention is applicable to IF transceivers as well, i.e. transceivers where the received RF frequency is down-converted to an Intermediate Frequency, and the transmitter also comprises at least one IF stage. The first and second embodiments shown in FIGS. 1 and 2 are implementable as IF transceivers as well as direct-conversion transceivers, wherein the full complex mixer is used as a down-converter in one or more of the one or more IF stages.

In the first embodiment, as shown in FIGS. 1 and 3, all parts are preferably integrated on a single RF-IC. The same is true for the second embodiment of the RF transceiver, as shown in FIG. 2.

The present radio frequency transceiver is advantageously used in a beamforming transceiver radio frequency integrated circuit.

Consequently, due to a reduced time for calibration, since it is merely made for the transmitter, it is possible to calibrate IQ imbalance in a shorter time, which increases the time available for the transceiver to transmit/receive useful data. In other words, the possible throughput increases. Furthermore, in many systems, the time in receive mode is often significantly larger than the time in transmit mode. In such systems, the omitted calibration of the receiver, which has been made unnecessary by means of the employment of the full complex mixer, to be carried out and the time available for reception is increased. No RF signal is required to be generated for calibration of the IQ error in receive mode, which simplifies the implementation of the circuit.

While the invention has been illustrated and described in detail in the drawings and foregoing description, such illustration and description are to be considered illustrative or exemplary and not restrictive. The invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A radio frequency transceiver, comprising:
   a transmitter,
   a receiver, wherein the receiver comprises a full complex mixer capable of operating as a frequency down-converter, and
   an in-phase and quadrature imbalance calibration module, wherein the in-phase and quadrature imbalance calibration module is connected only to an input of the transmitter of said transmitter and receiver, and is arranged to calibrate the transmitter,
   wherein the full complex mixer comprises radio signal in-phase and quadrature phase inputs, a cosine signal input, a sine signal input, first to fourth mixers, a subtractor, an adder, an in-phase signal output and a quadrature signal output, wherein the first and fourth mixers are connected with the in-phase and quadrature phase inputs, respectively, and with the cosine signal input, wherein the second and third mixers are connected with the in-phase and quadrature phase inputs, respectively and with the sine signal input, wherein the subtractor is connected with the first and third mixers and with the in-phase signal output, and wherein the adder is connected with the second and fourth mixers and with the quadrature signal output.

2. The radio frequency transceiver according to claim 1, further comprising a loopback connection from the transmitter to the receiver.

3. The radio frequency transceiver according to claim 1, further comprising an envelope detector connected with the receiver and with the in-phase and quadrature imbalance calibration module.

4. The radio frequency transceiver according to claim 1, wherein the receiver comprises a first receiver module for initial RF signal processing, and a second receiver module for continued signal processing of a frequency down-converted signal, wherein the full complex mixer is connected to the first receiver module and to the second receiver module.

5. The radio frequency transceiver according to claim 1, wherein the radio transceiver is a direct-conversion transceiver.

6. The radio frequency transceiver according to claim 1, wherein the in-phase and quadrature imbalance calibration module is adapted to not calibrate the receiver.

7. A beamforming transceiver radio frequency integrated circuit, comprising:
   a radio frequency transceiver, wherein the radio frequency transceiver comprises a transmitter and a receiver, wherein the receiver comprises a full complex mixer capable of operating as a frequency down-converter, and
   an in-phase and quadrature imbalance calibration module, and wherein the in-phase and quadrature imbalance calibration module is connected only to an input of the transmitter of said transmitter and receiver, and is arranged to calibrate the transmitter,
   wherein the full complex mixer comprises:
   radio signal in-phase and quadrature phase inputs,
   a cosine signal input,
   a sine signal input,
   first to fourth mixers,
   a subtractor,
   an adder,
   an in-phase signal output and a quadrature signal output,
   wherein the first and fourth mixers are connected with the in-phase and quadrature phase inputs, respectively, and with the cosine signal input,
   wherein the second and third mixers are connected with the in-phase and quadrature phase inputs, respectively, and with the sine signal input,
   wherein the subtractor is connected with the first and third mixers and the in-phase signal output, and
   wherein the adder is connected with the second and fourth mixers and with the quadrature signal output.

8. The beamforming transceiver radio frequency integrated circuit according to claim 7, further comprising a loopback connection from the transmitter to the receiver.

9. The beamforming transceiver radio frequency integrated circuit according to claim 7, further comprising an envelope detector module connected to the in-phase and quadrature imbalance calibration module.

10. The beamforming transceiver radio frequency integrated circuit according to claim 7, wherein the receiver comprises:
   a first receiver module for initial RF signal processing, and
   a second receiver module for continued signal processing of a frequency down-converted signal,
   wherein the full complex mixer is connected to the first receiver module and to the second receiver module.

11. The beamforming transceiver radio frequency integrated circuit according to claim 7, wherein the in-phase and quadrature imbalance calibration module is adapted to not calibrate the receiver.

12. A method of calibrating a radio frequency transceiver comprising a transmitter and a receiver, comprising:
   providing the receiver with a full complex mixer capable of operating as a frequency down-converter,
   providing the transmitter with an in-phase and quadrature (IQ) imbalance calibration module, wherein the IQ imbalance calibration module is connected only to an input of the transmitter of said transmitter and receiver, and
   calibrating the transmitter using the IQ imbalance calibration module,
   wherein the full complex mixer comprises a radio signal in-phase and quadrature phase inputs, a cosine signal input, a sine signal input, first to fourth mixers, a subtractor, an adder, an in-phase signal output, and a quadrature signal output, wherein the first and fourth mixers are connected with the in-phase and quadrature phase inputs, respectively, and with the cosine signal input, wherein the second and third mixers are connected with the in-phase and quadrature phase inputs, respectively, and with the sine signal input, wherein the subtractor is connected with the first and third mixers and the in-phase signal output, and wherein the adder is connected with the second and fourth mixers and with the quadrature signal output.

13. The method according to claim 12, wherein the IQ imbalance calibration module is adapted to not calibrate the receiver.

14. The method according to claim 12, further comprising providing a loopback connection from the transmitter to the receiver.

15. The method according to claim 12, further comprising providing an envelope detector connected with the transmitter and the IQ imbalance calibration module.

16. The method according to claim 12, wherein the receiver comprises a first receiver module for initial RF signal processing, and a second receiver module for continued signal processing of the frequency down-converted signal, and wherein the full complex mixer is connected to the first receiver module and to the second receiver module.

17. The method according to claim 12, wherein the radio frequency transceiver is a direct-conversion transceiver.

\* \* \* \* \*